(12) United States Patent
He

(10) Patent No.: US 8,248,535 B2
(45) Date of Patent: Aug. 21, 2012

(54) SYSTEM AND METHOD FOR A VERSATILE DISPLAY PIPELINE ARCHITECTURE FOR AN LCD DISPLAY PANEL

(75) Inventor: Lei He, Fremont, CA (US)

(73) Assignee: CSR Technology Inc., San Jose, CA (US)

( * ) Notice: Subject to any disclaimer, the term of this patent is extended or adjusted under 35 U.S.C. 154(b) by 357 days.

(21) Appl. No.: 12/643,341

(22) Filed: Dec. 21, 2009

(65) Prior Publication Data

US 2010/0208142 A1    Aug. 19, 2010

Related U.S. Application Data

(60) Provisional application No. 61/153,573, filed on Feb. 18, 2009.

(51) Int. Cl.
*H04N 9/76* (2006.01)

(52) U.S. Cl. ......... 348/598; 348/565; 348/584; 348/589

(58) Field of Classification Search .......... 348/598–600, 348/584, 586, 587, 589, 590, 563–565, 591–592; 345/435, 428, 432; *H04N 9/76*
See application file for complete search history.

(56) References Cited

U.S. PATENT DOCUMENTS

| | | | |
|---|---|---|---|
| 4,985,848 A | 1/1991 | Pfeiffer et al. | |
| 6,005,638 A | 12/1999 | Blair et al. | |
| 6,803,968 B1 * | 10/2004 | Numata | 348/584 |
| 6,847,358 B1 * | 1/2005 | Ford et al. | 345/419 |
| 7,561,777 B2 * | 7/2009 | Carlsgaard et al. | 386/239 |
| 2005/0046631 A1 | 3/2005 | Tidwell | |
| 2005/0097620 A1 | 5/2005 | Fye | |
| 2005/0125179 A1 | 6/2005 | Selby et al. | |
| 2005/0162566 A1 | 7/2005 | Chuang et al. | |
| 2006/0198384 A1 | 9/2006 | Gresham | |
| 2007/0242160 A1 * | 10/2007 | Garg et al. | 348/565 |
| 2008/0117219 A1 | 5/2008 | Bakalash et al. | |

OTHER PUBLICATIONS

International Search Report and Written Opinion in corresponding Patent Application No. PCT/US2009/068990 dated Feb. 19, 2010.

* cited by examiner

*Primary Examiner* — Trang U Tran
(74) *Attorney, Agent, or Firm* — Lando & Anastasi, LLP

(57) ABSTRACT

A video processing system comprising a video frame buffer memory, a first video pipeline, a second video pipeline, a blender, and an overdrive processing unit. The video frame buffer memory has a first memory region and a second memory region, the first memory region being configured to store a first video data frame and the second memory region being configured to store a second video data frame. The first video pipeline is coupled to the video frame buffer memory and configured to receive and process the first video data frame. The second video pipeline is coupled to the video frame buffer memory and configured to receive and process the second video data frame. The blender is coupled to the first and second video pipelines and is configured to receive and blend the processed first video data frame and the processed second video data frame in a first mode of operation and to provide the blended processed first and second video data frame to a display. The overdrive processing unit is coupled to the first and second video pipelines, and is configured to receive the processed first video data frame and the processed second video data frame in a second mode of operation, to modify the processed first video data frame based upon pixel values of the processed second video data frame, and to provide the modified processed first current video data frame to the display.

17 Claims, 6 Drawing Sheets

| Index of new frame data | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 1 | 32 | 16 | 8 | 6 | 4 | 2 | 0 | 0 | 0 | 0 | 0 | 0 | 0 | 0 | 0 | 0 | 0 |
| 2 | 82 | 54 | 32 | 20 | 14 | 12 | 8 | 4 | 0 | 0 | 0 | 0 | 0 | 0 | 0 | 0 | 0 |
| 3 | 134 | 104 | 70 | 48 | 28 | 22 | 18 | 16 | 14 | 12 | 10 | 8 | 6 | 4 | 2 | 0 | 0 |
| 4 | 170 | 144 | 122 | 98 | 64 | 56 | 48 | 40 | 30 | 25 | 20 | 17 | 14 | 12 | 10 | 9 | 8 |
| 5 | 182 | 160 | 138 | 116 | 94 | 80 | 66 | 56 | 48 | 42 | 36 | 30 | 24 | 18 | 12 | 10 | 9 |
| 6 | 194 | 174 | 156 | 134 | 116 | 106 | 96 | 80 | 66 | 58 | 50 | 40 | 32 | 28 | 24 | 20 | 16 |
| 7 | 206 | 186 | 168 | 152 | 140 | 130 | 120 | 112 | 102 | 92 | 80 | 68 | 60 | 52 | 44 | 34 | 24 |
| 8 | 214 | 196 | 182 | 170 | 156 | 150 | 144 | 136 | 128 | 120 | 112 | 102 | 92 | 72 | 64 | 54 | 44 |
| 9 | 220 | 206 | 194 | 182 | 174 | 168 | 162 | 156 | 150 | 144 | 137 | 130 | 122 | 114 | 106 | 96 | 68 |
| 10 | 226 | 216 | 204 | 196 | 188 | 184 | 180 | 176 | 170 | 165 | 160 | 154 | 148 | 142 | 134 | 124 | 116 |
| 11 | 232 | 224 | 218 | 212 | 206 | 200 | 196 | 192 | 189 | 186 | 181 | 176 | 170 | 166 | 160 | 154 | 144 |
| 12 | 238 | 232 | 226 | 220 | 216 | 214 | 212 | 209 | 206 | 203 | 200 | 196 | 192 | 188 | 184 | 178 | 172 |
| 13 | 243 | 238 | 234 | 230 | 228 | 226 | 224 | 223 | 222 | 220 | 218 | 215 | 212 | 208 | 204 | 200 | 196 |
| 14 | 248 | 245 | 242 | 240 | 239 | 238 | 237 | 236 | 234 | 233 | 232 | 230 | 228 | 226 | 224 | 221 | 218 |
| 15 | 255 | 254 | 253 | 252 | 251 | 250 | 249 | 248 | 247 | 246 | 245 | 244 | 243 | 242 | 241 | 240 | 238 |
| | 255 | 255 | 255 | 255 | 255 | 255 | 255 | 255 | 255 | 255 | 255 | 255 | 255 | 255 | 255 | 255 | 255 |

Fig. 5

SYSTEM AND METHOD FOR A VERSATILE DISPLAY PIPELINE ARCHITECTURE FOR AN LCD DISPLAY PANEL

CROSS REFERENCE TO RELATED APPLICATIONS

This application claims priority under 35 U.S.C. §119(e) to U.S. Provisional Application Ser. No. 61/153,573 entitled "Versatile Display Pipeline Architecture to Support Picture in Picture and LCD Panel Overdrive" filed Feb. 18, 2009, which is incorporated herein by reference in its entirety.

BACKGROUND OF THE INVENTION

1. Field of the Invention

The present invention is directed to liquid crystal display panels. More particularly, methods and systems relating to supporting blending functionality (e.g., "picture in picture" display, hereinafter "PiP") and overdrive functionality in a versatile display pipeline architecture are provided.

2. Discussion of the Related Art

Liquid crystal display (LCD) panels are used in a wide range of electronic products, including computers, monitors, flat panel displays, and televisions, among others. LCD displays are matrices of liquid-filled cells that form pixels. When voltage is applied to a pixel, the pixel becomes transparent to light, the transparency increasing with voltage. Thus, by varying the amount of voltage applied to the pixel, different luminance levels can be achieved. LCD panels offer the high resolution, refresh rates, and response times necessary for high-definition viewing of software, graphics, videos, and other media. LCD panels are typically controlled by a display system controller, such as the SupraHD® 780 processor from Zoran Corporation of Sunnyvale, Calif.

LCD panels are essentially a type of "sample and hold" device. As such, they are known to suffer from motion blur and other undesirable artifacts that are a result of the time lag that occurs between the moment a voltage is applied to a pixel and the moment when the pixel achieves the steady-state luminance for that voltage. Therefore, in many systems incorporating LCD panels, overdrive functionality is used to reduce motion blur and other artifacts resulting from this time lag. In these systems, image data for both a current frame and an immediately prior frame is provided to an overdrive processing unit. The overdrive processing unit determines from the current data frame what the luminance value should be for each pixel as well as the corresponding voltage required to generate that level of luminance. The overdrive processing unit also accesses the immediately prior data frame to determine an adjustment in voltage that can be made from the immediately immediately prior data frame to achieve the proper luminance for the current data frame. The overdrive processing unit may calculate this value on its own or it may refer to a lookup table where, for each pair of voltages corresponding to the immediately previous voltage and the current voltage of a given pixel, a target voltage is provided. This target voltage is used to generate the luminance for the pixel for the current frame.

The general concepts associated with using overdrive to reduce or eliminate undesirable artifacts when driving an LCD panel are illustrated in FIG. 1. As can be seen, there is a time lag between the moment a voltage V2 is applied to a pixel of an LCD panel cell at luminance level L1 and the moment at which the luminance level L2 is achieved, where the luminance level L2 is the steady state luminance that would be achieved by applying voltage V2 to the pixel for a prolonged period of time (i.e., over several frames). This time lag may have a duration 110 in the range of 33 ms, for example, whereas each frame of video data (e.g., frame $F_{n-1}$, frame $F_n$, frame $F_{n+1}$, frame $F_{n+2}$, etc.) only has a duration 120 of 16 ms long.

Referring still to FIG. 1, by applying to the pixel a voltage V2' that is higher than the voltage V2 that will maintain the pixel at luminance L2, the pixel is "overdriven" and achieves desired luminance L2 in a much shorter duration 130, for example, 12 ms. Since the desired luminance L2 is achieved during the current frame $F_n$ (rather than two frames later, in the case where voltage V2 is applied), motion blur and other artifacts can be reduced or eliminated along with the aforementioned time lag.

Methods are known in the art to modify the pixel data for a given video data frame to take advantage of this overdrive effect. For example, with reference again to FIG. 1, a pixel in the current data frame has a desired luminance value of L2, whereas the same pixel in the immediately prior data frame had a luminance value of L1. The pixel in the current data frame can be modified to have a luminance value of L2', which causes the display device, when it displays the pixel, to apply voltage V2' to the pixel and thereby achieve the overdrive effect described above.

Another illustration of modifying pixels to take advantage of the overdrive effect is shown in FIG. 2, using exemplary luminance values. In frame N, a target luminance value of 150 is desired. However, the same pixel in the immediately prior frame N−1 had a luminance value of 100. To overcome the time lag associated with modifying the luminance from 100 to 150 during the current frame, the pixel in the current frame may be modified to have a luminance value of 175. This causes a correspondingly higher voltage to be applied during the current frame, which in turn causes the pixel to more quickly achieve an actual luminance value of 150 so that it is achieved during the current frame. Similarly, in the following frame N+1, to achieve a target luminance value of 100, the pixel may be modified to have a luminance value of 75 to more quickly decrease from a luminance value of 175 to 100 during the current frame.

It will be appreciated that the term "overdrive" as used herein refers to modifying the to luminance value of a pixel to be either higher or lower than the target luminance value depending on which direction the luminance is being modified. In other words, "overdrive" refers to both "overshooting" and "undershooting" the target luminance value of a pixel.

LCD panels incorporating overdrive functionality in the past have required an overdrive memory buffer for storing the immediately prior frame of data, such that the luminance values therein can be referenced in carrying out the overdrive techniques discussed above. This memory buffer increases the size, cost, and complexity of the LCD panel system.

Blending is a technique used in display devices to allow two different data sources (for example, two different channels on television) to be displayed simultaneously. One common example of blending is the "picture in picture" ("PiP") feature seen on some televisions. In PiP mode, a first data source may be displayed on a television. However, a portion of each frame of the first data source may be removed and replaced (i.e., blended) with a reduced-size version of a current frame of the second data source. This "picture within a picture" can be displayed in a corner of the larger display, and its size and position may be configurable as well.

Blending may also be used to achieve a "side by side" ("SBS") feature. In SBS mode, each frame of data from two data sources may be reduced in size and displayed in distinct areas of the display device, either side-by-side or in any other desired orientation.

SUMMARY

The present invention eliminates the need for a dedicated overdrive memory buffer (along with the associated size, complexity, and cost) by selectively utilizing the blending video pipeline when it is not otherwise in use to provide the immediately prior data frame to an overdrive processing unit. When the immediately prior data frame is passed to the blending video pipeline, the overdrive processing unit can continuously perform the calculations and functions described above for providing overdrive functionality, without the need for a separate overdrive memory buffer. When, on the other hand, blending functionality is desired, a current video data frame of a second data source is passed to the blending video pipeline, and overdrive processing is discontinued on the blending video pipeline. A versatile video pipeline is therefore provided that can be selectively populated with different types of video data and routed through particular components depending on whether blending functionality or overdrive functionality is desired. The versatile video pipeline can manipulate and provide the video data in this way such that either blending functionality or overdrive functionality can be selected and used on the LCD display at any given time. By using the blending video pipeline in such a versatile manner, the complexity and cost of the system is reduced.

It will be appreciated that references to "pixel luminance values" herein should be construed to include pixels in a data format where an explicit luminance value is not used. For example, in the RGB data format, "pixel luminance values" would include the additive primary color value for each of the red, green, and blue components, i.e., a color value from 0 to 255. In other embodiments, "pixel luminance values" may refer to other color formats. The present invention is not limited to any particular pixel format, and contemplates modifying luminance values, additive color values, and/or any other pixel data values known in the art.

According to one aspect of the present invention, a video processing system is provided. The video processing system comprises a video frame buffer memory, a first video pipeline, a second video pipeline, a blender, and an overdrive processing unit. The video frame buffer memory has a first memory region and a second memory region, the first memory region being configured to store a first video data frame and the second memory region being configured to store a second video data frame. The first video pipeline is coupled to the video frame buffer memory and configured to receive and process the first video data frame. The second video pipeline is coupled to the video frame buffer memory and configured to receive and process the second video data frame. The blender is coupled to the first and second video pipelines and is configured to receive and blend the processed first video data frame and the processed second video data frame in a first mode of operation and to provide the blended processed first and second video data frame to a display. The overdrive processing unit is coupled to the first and second video pipelines, and is configured to receive the processed first video data frame and the processed second video data frame in a second mode of operation, to modify the processed first video data frame based upon pixel values of the processed second video data frame, and to provide the modified processed first current video data frame to the display.

In accordance with one embodiment, in the first mode of operation the processed first video data frame is displayed in a first portion of the blended processed first and second video data frame and the processed second current video data frame is displayed in a second portion of the blended processed first and second video data frame.

In accordance with a further embodiment, the display is an LCD television display, and the second portion of the blended processed first and second video data frame is a "picture-in-picture" window within the first portion of the blended processed first and second video date frame.

In accordance with another embodiment, in a third mode of operation the blender is configured to provide the processed first video data frame to the display without any blending.

In accordance with a further embodiment, the video processing system further comprises a control processor, coupled to the video frame buffer memory, the first and second video pipelines, the blender, and the overdrive processing unit, to configure the video frame buffer memory, the first and second video pipeline, the blender, and the overdrive processing unit according to a selection of one of the first mode of operation, the second mode of operation, and the third mode of operation by a user.

In accordance with another embodiment, the video frame buffer memory, the first and second video pipelines, the blender, and the overdrive processing unit are disposed on a single microchip.

In accordance with still another embodiment, the video processing system further comprises a multiplexer having a first input operatively coupled to the blender, a second input operatively coupled the overdrive processing unit, and an output operatively coupled to the display, the multiplexer providing one of the blended processed first and second video data frame and the modified processed first video data frame to the display.

In accordance with another embodiment, the video processing system further comprises at least one lookup table stored in memory that is distinct from the video frame buffer memory, and in the second mode of operation the overdrive processing unit is configured to access at least one overdrive pixel value stored in the at least one lookup table and modify a first pixel value of a pixel in the processed first video data frame based upon the at least one overdrive pixel value and a second pixel value of a corresponding pixel in the processed second video data frame.

In accordance with a further embodiment, the at least one lookup table is a first lookup table storing at least one overdrive red pixel value, a second lookup table storing at least one stored green pixel value, and a third lookup table storing at least one overdrive blue pixel value; the pixel and the corresponding pixel conform to an RGB color format; and in the second mode of operation the overdrive processing unit is configured to replace a red pixel value of the pixel with one of the at least one overdrive red pixel values, to replace a green pixel value of the pixel with one of the at least one overdrive green pixel values, and to replace to a blue pixel value of the pixel with one of the at least one overdrive blue pixel values.

In accordance with a further embodiment, the first pixel value is modified to a greater extent when the first pixel value is greater than the second pixel value than when the first pixel value is less than the second pixel value.

In accordance with another embodiment, the video processing system is disposed in a digital LCD television that includes an LCD display.

In accordance with yet another embodiment, the first video data frame is a first current video data frame received from a first data source; in the first mode of operation, the second video data frame is a second current video data frame received from a second data source, and in the second mode of operation, the second video data frame is an immediately prior video data frame relative to the first current video data frame received from the first data source.

In accordance with another aspect of the present invention, a method of processing frames of video data is provided. The method comprises acts of storing a first video data frame in a first memory region; storing a second video data frame in a second memory region; processing the first video data frame in a first video pipeline to provide a processed first video data frame; processing the second video data frame in a second video pipeline to provide a processed second current video data frame; blending, responsive to selection of a first mode of operation, the processed first video data frame and the processed second video data frame to provide a blended processed first and second video data frame; modifying, responsive to selection of a second mode of operation, the processed first video data frame based upon pixel values of the processed second video data frame to provide a modified processed first video data frame; and providing one of the blended processed first and second video data frame and the modified processed first video data frame to a display responsive to selection of one of the first mode of operation and the second mode of operation.

In accordance with one embodiment, the act of blending includes storing the processed first video data frame in a first portion of the blended processed first and second video data frame; and storing the processed second video data frame in a second portion of the blended processed first and second video data frame.

In accordance with yet another embodiment, the act of modifying the processed first video data frame based upon pixel values of the processed second video data frame includes the acts of replacing a red pixel value of at least one pixel of the processed first video data to frame with an overdrive red pixel value stored in a first lookup table replacing a green pixel value of the at least one pixel with an overdrive green pixel value stored in a second lookup table; and replacing a blue pixel value of the at least one pixel with an overdrive blue pixel value stored in a third lookup table.

In accordance with still another embodiment, the method further comprises acts of disabling an overdrive processing unit responsive to selection of a first mode of operation; and disabling a blender responsive to select of a second mode of operation.

In accordance with yet another embodiment, the first video data frame is a first current video data frame received from a first data source, wherein in the first mode of operation, the second video data frame is a second current video data frame received from a second data source, and wherein in the second mode of operation, the second video data frame is an immediately prior video data frame relative to the first current video data frame received from the first data source.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates an exemplary luminance lookup table in accordance with one embodiment of the invention.

DETAILED DESCRIPTION

Figure 1:
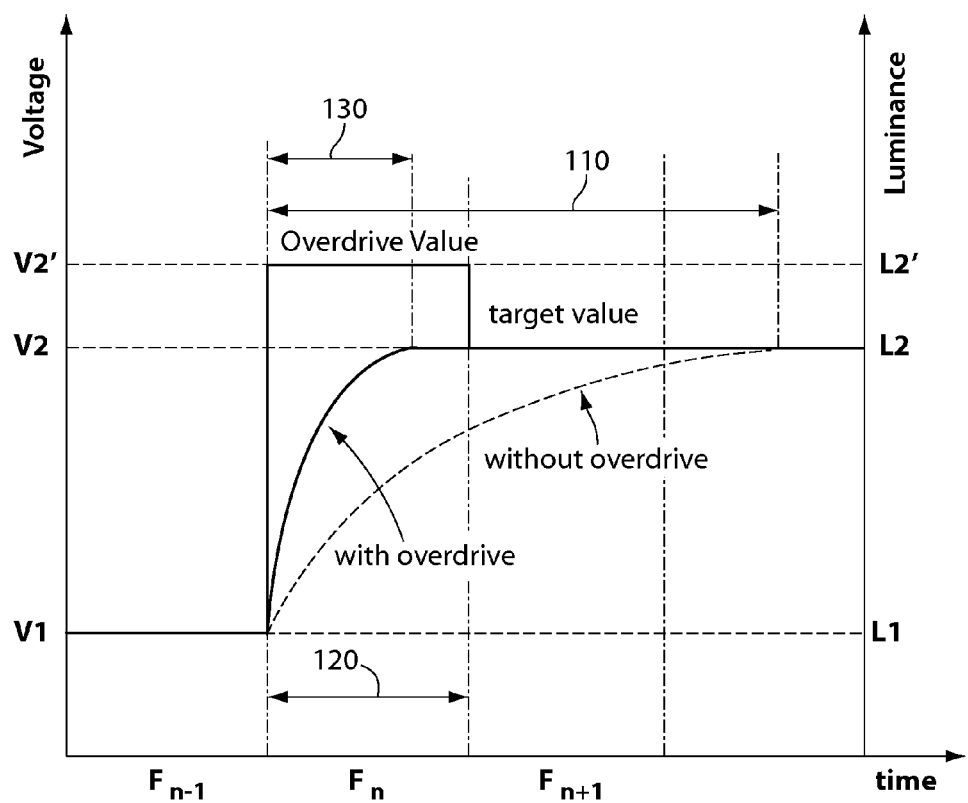
FIG. 1 illustrates typical response times associated with applying voltage to a pixel of an LCD panel.
Figure 2:
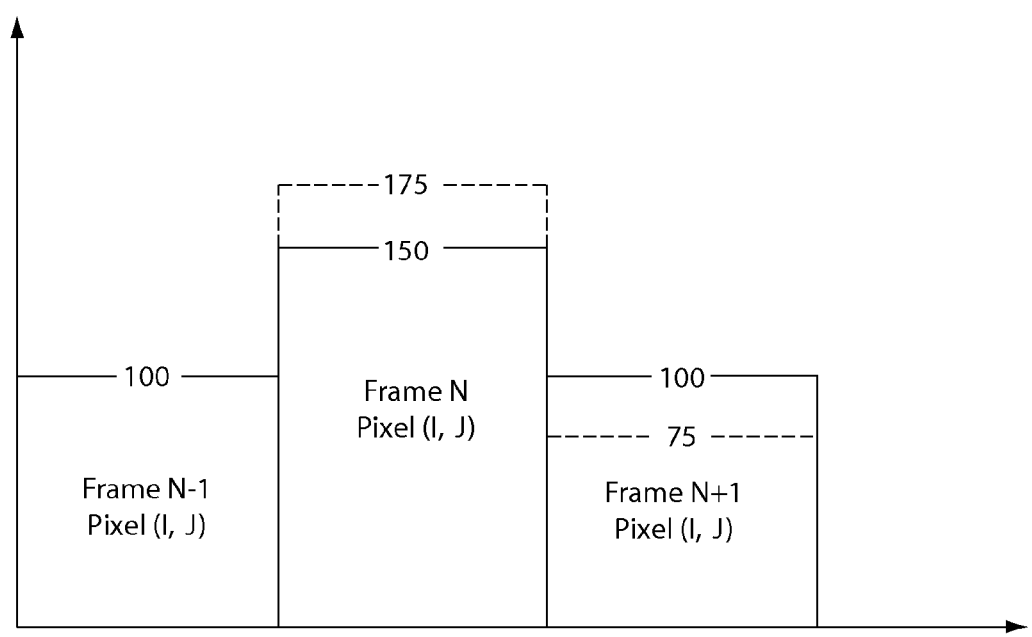
FIG. 2 depicts an exemplary three frame sequence in which overdrive values are used.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Figure 3:
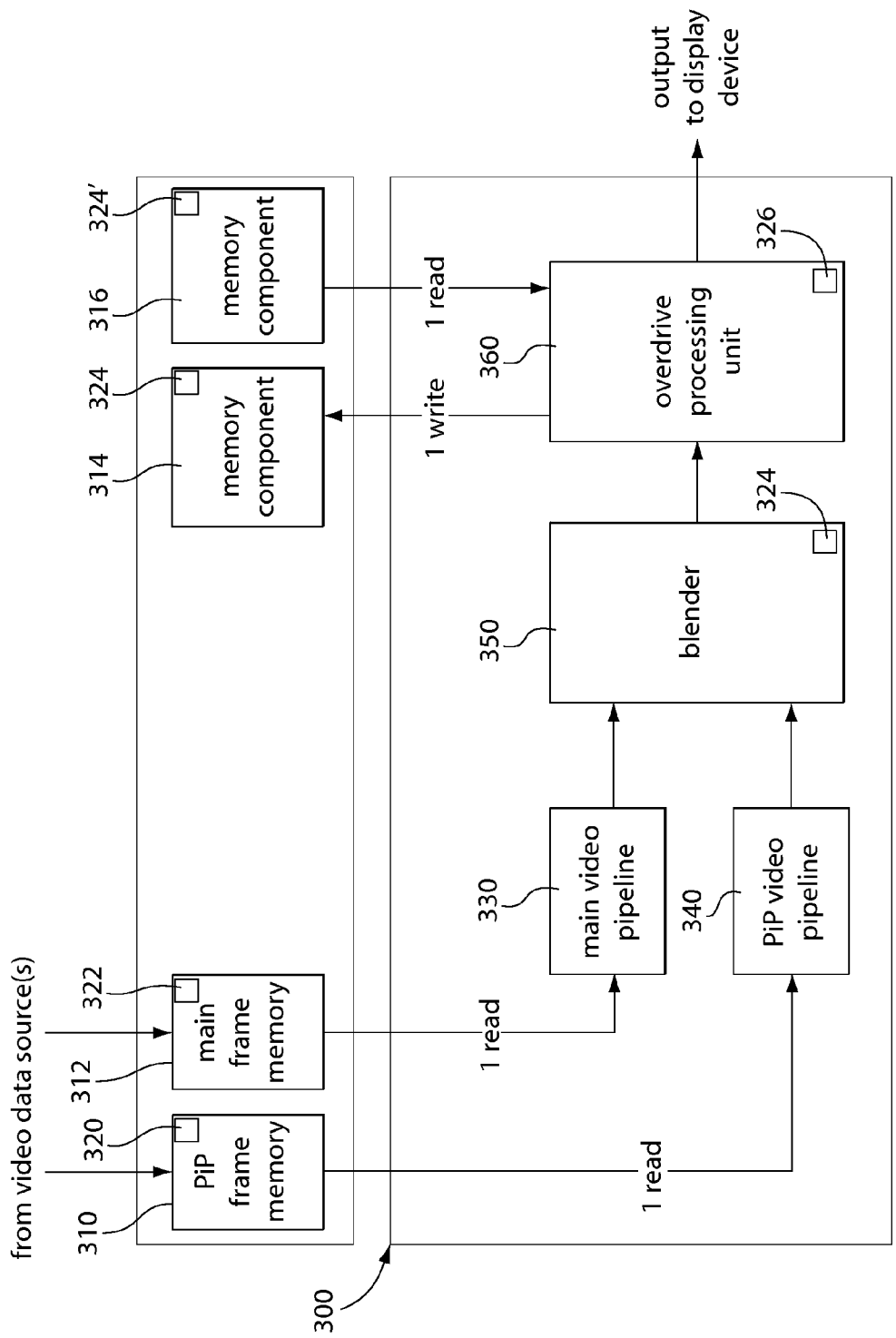
FIG. 3 shows a conventional display pipeline architecture that includes blending and overdrive functionality.

A conventional display system 300 incorporating both an overdrive processing unit 360 and "picture in picture" (PiP) technology (or other types of blending, such as side-by-side, picture-out-of-picture, on-screen displays, subtitles, etc.) can be seen at FIG. 3. As can be seen, a PiP data frame 320 from a first data source and a main data frame 322 from a second data source can be stored in a PiP frame memory 310 and a main frame memory 312, respectively. The PiP data frame 320 and the main data frame 322 are processed by a PiP video pipeline 340 and a main video pipeline 330, respectively, wherein components are provided to process the respective frames according to methods known in the art. The processed PiP data frame 320 and the main data frame 322 are passed to a blender 350. The blender may be configured to operate even when no PiP data frame 320 is provided, and in that event may simply output the main data frame 322 where a blended data frame would otherwise be provided. When a PiP data frame 320 is provided to the blender 350, the blender 350 prepares a blended data frame 324, that, when displayed, shows the PiP data frame 320 reduced in size and substituted for a portion of the main data frame 322. The blended data frame 324 is passed to the overdrive processing unit 360, which uses memory components 314, 316 to store the current and immediately prior video data frames in order to achieve the overdrive effect described above. Specifically, since the overdrive processing unit 360 receives only the blended data frame 324 representing the current data frame, one of the memory components 314, 316 is used to store the immediately prior blended data frame 324' so that it may be referenced when performing overdrive calculations. The overdrive processing unit 360 then provides the overdrive data frame 326 to a display device (not shown). When the PiP function is used, the resulting effect is that a reduced size view of the second data source appears to overlay a part of the full-size display of the first data source so that both data sources can be simultaneously displayed.

In this system, both the PiP function and the overdrive function can be used simultaneously. However, one drawback of system 300 and related systems is the necessity of memory components 314, 316 to buffer the immediately previous blended data frame 324'. These memory components 314, 316 increase the complexity of the system by requiring at least one additional read operation and one additional write operation for each frame of video data. These read and write operations require a relatively long time to complete, and so increased bandwidth (i.e., a higher number of communication channels) and/or a faster processor may be necessary to increase the throughput of the system 300 to an acceptable level. However, increasing the speed and/or bandwidth of the processor increases the cost and complexity of the system. Furthermore, if the system 300 is provided on a single chip, the inclusion of these memory components 314, 316 may increase the size of the system 300 to a point where it is too large to fit on the chip or too costly. If external memory components are instead used, this can further increase the cost and complexity of the system 300 as an additional memory interface and interface pins are typically required.

Example System Architecture

Figure 4:
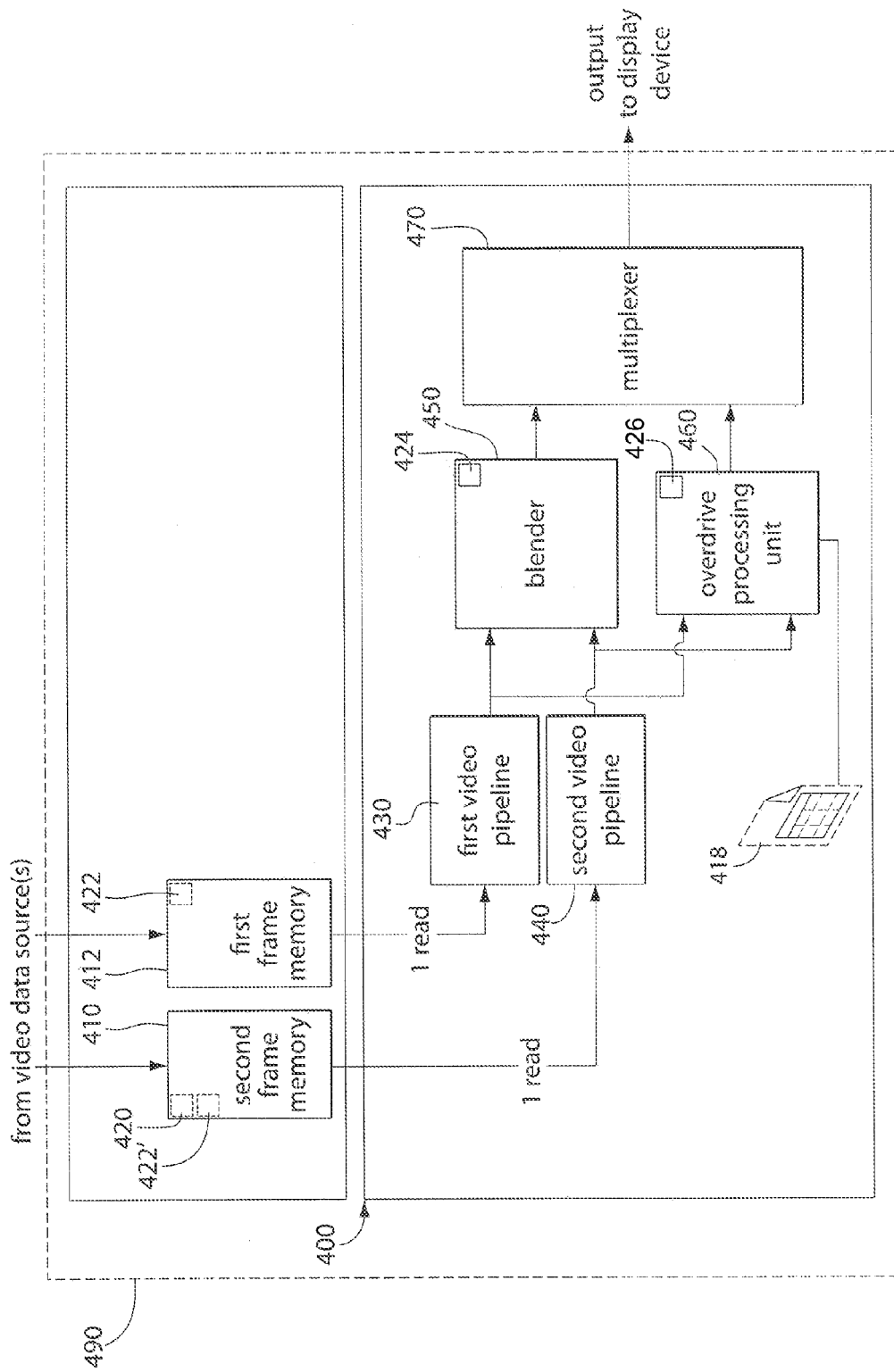
FIG. 4 depicts a versatile display pipeline architecture that provides blending and overdrive functionality in accordance with one embodiment of the invention.

Embodiments of the present invention eliminate or reduce the costs and complexity associated with systems having an overdrive processing unit that buffers frame data in external memory components. A system 400 in accordance with one such embodiment is illustrated in FIG. 4. In system 400, a display pipeline is provided that allows overdrive processing to be carried out by utilizing an existing blending video pipeline when it is not otherwise being used, thereby eliminating the need for external memory components such as memory components 314, 316. This in turn reduces the cost, size, and complexity of the system 400. A first frame memory 412 and a second frame memory 410 are provided. The first frame memory 412 and the second frame memory 410 are communicatively coupled to at least one data source (not shown). The first frame memory 412 is configured to be populated with a current data frame 422 from a first data source. The current frame is referred to herein as "frame N," whereas an immediately prior frame from the same data source is referred to as "frame N−1." The second frame memory 410 is configured to be selectively populated with data responsive to being in one of two operation modes in accordance with the configuration of a multiplexer 470.

In a blending operation mode, the second frame memory 410 may be populated with a second current data frame 420 (i.e. "frame N") from a second data source. Current data frames to 422, 420 are processed by a first video pipeline 430 and a second video pipeline 440, respectively. A blender 450 is configured to receive the processed data frames 420, 422. In some embodiments, the blender 450 is configured to operate even when only one processed data frame 420 is provided (e.g., when only one data source is currently being displayed). In these embodiments, the blender 450 may simply pass the single processed data frame 420 as output. In several embodiments where both processed data frames 420, 422 are received by the blender 450, the blender 450 may generate a blended data frame 424 in which the current data frame 420 is reduced in size and substituted for a portion of the current data frame 422. The effect is such that the blended data frame 424 represents an image in which the second current data frame 420 will appear as a "picture in a picture" within the current data frame 422. In the blending operation mode, a multiplexer 470 receives the blended data frame 424 from the blender 450 and provides it to a display device (not shown).

In an overdrive operation mode, the second frame memory 410 is instead populated with an immediately prior data frame 422' from the first data source. In other words, the first frame memory 412 has been populated with frame N of the first data source, and the second frame memory 410 is populated with the immediately prior frame (frame N−1) of the same data source. The current data frame 422 and the immediately prior data frame 422' are processed by the first video pipeline 430 and the second video pipeline 440, respectively. An overdrive processing unit 460 receives the processed current data frame 422 and the immediately prior data frame 422' and modifies the processed current data frame 422 based upon pixel luminance values of the immediately prior data frame 422'. In some embodiments, this modification may be done with reference to a lookup table 418, as is described in more detail below. In the overdrive mode, the multiplexer 470 receives the modified processed current data frame 426 from the overdrive processing unit 460 and provides it to the display device.

It will be appreciated that in accordance with the present invention, the contents of the first frame memory 412 and the second frame memory 410 are delivered from the first video pipeline 430 and the second video pipeline 440, respectively, to both the blender 450 and the overdrive processing unit 460. In accordance with one embodiment, both the blender 450 and the overdrive processing unit 460 perform their respective functions on the data irrespective of which operation mode (i.e., blending or overdrive) the system 400 is operating in. In this embodiment, the multiplexer 470 is responsible for selecting whether to provide the output to from the blender 450 or the output from the overdrive processing unit 460 to the display. In another embodiment, the blender 450 and/or the overdrive processing unit 460 may be selectively disabled when the output from one of those components is not being used, for example, to reduce processor utilization. For example, in some embodiments it may be desirable to disable the blender 450 when in the overdrive operation mode. The multiplexer 470 may enable and disable these or other components as desired, or another controller (not shown) may control their operation.

Referring still to FIG. 4, the first frame memory 412 and the second frame memory 410 may include memory components such as ROM, RAM, Flash, or other memory components known in the art. The first frame memory 412 and the second frame memory 410 are of a size and capacity to store at least one frame of image data at a resolution suitable for display on an LCD television, for example, 1680×1050 pixels, 1920×1080 pixels, or other resolutions. The first frame memory 412 and the second frame memory 410 may be coupled to at least one video source such that they can be populated with each frame of video data from the video source as it is being played. For example, the first frame memory 412 and/or the second frame memory 410 may be populated with digital video data from a cable or analog television receiver; a DVD or Blu-Ray® player, a video game system, or any other source of digital video data.

The first frame memory 412 and the second frame memory 410 are communicatively coupled to the first video pipeline 430 and the second video pipeline 440, respectively. In several embodiments, the first video pipeline 430 and the second video pipeline 440 may each include at least one component for processing digital images provided to them from the first frame memory 412 and the second frame memory 410, respectively. These components may be communicatively coupled within each pipeline and may perform such functions as video decoding, MPEG decoding, deinterlacing, noise reduction, image scaling, gamma correction, image enhancement, colorspace conversion, chroma resampling, frame rate conversion, image compression/video compression, or any other image or video processing functions or methods as are known in the art. In some embodiments, these components may be analog or digital processors. In other embodiments, they may be implemented with logic gates, software, or firmware executed on a processor, or in a combination of hardware, software, and/or firmware. The first video pipeline 430 and the second video pipeline 440 may include memory components such as ROM, RAM, Flash, or other memory components known in the art.

Referring still to FIG. 4, the blender 450 is communicatively coupled to the first video pipeline 430 and the second video pipeline 440, respectively. When in blending operation mode, the blender 450 is configured to receive the processed current data frame 422 and the processed second current data frame 420 from the first video pipeline 430 and the second video pipeline 440, respectively. The blender 450 generates the blended data frame 424 by blending the current data frame 422 and the second current data frame 420 to create a "picture-in-picture" video image or other type of blended image, such as on-screen displays, subtitles, etc. as known in the art. In several embodiments, this may include displaying a reduced-size version of the second data source as an overlay over the first data source. This allows a user of a television or other display device to monitor the second data source, for example, a second television program or an on-screen display menu, while continuing to watch the first data source, for example, a first television program.

To achieve a blending effect (e.g., picture-in-picture), the blender 450 may incorporate functionality to reduce the size of the second current data frame 420. Such functionality may include any analog or digital processor, or may be any image-resizing algorithm known in the art and encoded on a computer-readable medium. In several embodiments, the blender 450 replaces a portion of the processed current data frame 422 with the reduced size second current data frame 420. The blender 450 may incorporate memory components such as ROM, RAM, Flash, or other memory components known in the art in order to generate and frame the blended data frame 424. In some embodiments, the blender 450 may include analog or digital components. In other embodiments, the blender 450 may be implemented with logic gates, software, or firmware executed on a processor, or in a combination of hardware, software, and/or firmware. In some embodiments, the blender 450 may be configured to operate even when no second current data frame 420 is provided by simply passing the first current data frame 422 as output to the multiplexer 470.

Referring still to FIG. 4, the overdrive processing unit 460 is communicatively coupled to the first video pipeline 430 and the second video pipeline 440. When in overdrive operation mode, the overdrive processing unit 460 is configured to receive the processed current data frame 422 and the processed immediately prior data frame 422' from the first video pipeline 430 and the second video pipeline 440, respectively. The overdrive processing unit 460 incorporates functionality to modify the processed current data frame 422 based upon pixel luminance values of the immediately prior data frame 422'. For example, in some to embodiments, the overdrive processing unit 460 performs a mathematical calculation on the luminance values of a pixel in the processed current data frame 422 and the corresponding pixel in the processed immediately prior data frame 422'. For example, with reference back to FIG. 1, when going from a lower luminance L1 to a higher luminance L2 for a particular pixel, the overdrive processing unit 460 may increase the luminance of the pixel in the processed current data frame 422 by a certain percentage over L2 in order to achieve L2 luminance more quickly in accordance with the overdrive effect described above. Similarly, when going from a higher luminance L2 to a lower luminance L3 (not shown) for a different pixel, the overdrive processing unit 460 may decrease the luminance of the pixel in the processed current data frame 422 by a certain percentage below L3 in order to achieve L3 luminance more quickly in accordance with the overdrive effect described above. It is a characteristic of most LCD panel pixels that it takes longer to increase the luminance of a pixel by a certain amount than to decrease it by the same amount. Therefore, in some embodiments the amount by which a current pixel's luminance value is adjusted may differ depending on the direction (i.e., positive or negative) in which the luminance is being modified.

Referring again to FIG. 4, in some embodiments the overdrive processing unit 460 references at least one lookup table 418 to determine how to modify the processed current data frame 422. In these embodiments, the overdrive processing unit 460 is communicatively coupled to the lookup table 418, which may be stored in memory components such as ROM, RAM, Flash, or other memory components known in the art. In some embodiments, the lookup table 418 may be stored in non-volatile memory in a data structure such as a file, record, or other data storage structure known in the art. In other embodiments, the lookup table 418 may be stored as a relational database accessible with SQL or other query language. In still other embodiments, the lookup table 418 may be stored in markup format such as XML.

A sample lookup table 418 is illustrated in FIG. 5. It will be appreciated that several lookup tables may be employed in the system 200 depending on the data format in which pixels are stored. For example, in embodiments where system 200 operates on the RGB (red-green-blue) color model, a separate lookup table 418 may be stored and referenced for each of the three additive primary colors (i.e., red, green, and blue). In this way, the value of each additive primary color for each pixel can be modified with reference to the lookup table 418 for that color.

The lookup table 418 may be configured to store luminance values for any pixel format known in the art, for example, pixels having memory addresses of 8 bits, 10 bits, 12 bits, or any other dimension. It will be appreciated that references to "pixel luminance value" herein contemplate and encompass embodiments where pixels store separate values for each of the additive primary colors as discussed above. In other embodiments, the system 200 and the lookup table 418 may be configured to utilize and store overdrive values for pixels in other formats. For example, in some embodiments, overdrive luminance values for the "Y" (luminance) component of a YCbCr data format may be stored.

Referring still to FIG. 5, the rows 510a-q may correspond to different luminance indices, values, or ranges of luminance values for a current pixel. The columns 520a-q may similarly correspond to different luminance indices, values, or ranges of luminance values for the corresponding pixel in the immediately prior data frame 422'. In some embodiments, the table may store at the intersection of each row and column a luminance value that can be used in place of the luminance value previously associated with each pixel in the processed current data frame 422. This replacement luminance value causes the LCD panel to be overdriven in the manner described above. In some embodiments where it is desirable to reduce the size of the lookup table 418, luminance indices may be used wherein the luminance index is a quantization of a luminance value. In some embodiments, interpolation may be performed between adjacent values in the lookup table 418 when a pixel has a non-integer luminance index.

In one exemplary embodiment, the luminance index is the actual luminance value divided by 16, where the actual luminance value is within a range from 0 (black) to 255 (white). For a demonstration of how the lookup table 418 may be referenced, assume for the following examples that a pixel in the current data frame ("the current pixel") has a luminance value of 128, meaning that a luminance value of 128 will maintain the pixel at its desired luminance indefinitely once that luminance is achieved. A luminance value of 128 gives the pixel a luminance index of 8 (128/16). Thus, reference is made in the following examples to row 510$i$, corresponding to a pixel in the current frame having a luminance index of 8.

In a first example, assume that the corresponding pixel in the immediately prior data frame 422' also had a luminance value of 128, meaning that the pixel has not changed luminance between the two frames. This pixel therefore also has a luminance index of 8. Referring to the lookup table 418 in FIG. 5, the intersection of row 510$i$ (the current pixel to having a luminance index of 8) and column 520$i$ (the immediately prior pixel having a luminance index of 8) contains a first cell 530, which stores a luminance value of 128. Since the current pixel already has a luminance value of 128, the current pixel need not be modified to achieve an overdrive effect because the pixel is already at the desired luminance, and only need be maintained by the "steady state" luminance value of 128 of the current luminance.

In a second example, assume the pixel in the immediately prior data frame had a luminance value of 16, giving it a luminance index of 1, found at column 520$b$. In a second cell 540 found at the intersection of row 510$i$ (the current pixel having a luminance index of 8) and column 520$b$ (the immediately prior pixel having a luminance index of 1), a luminance value of 196 is stored. Thus, giving the pixel a luminance value of 196 in the current frame may cause the pixel to be increased to an actual luminance value of 128 within the span of the current frame.

In a third example, assume the pixel in the immediately prior data frame had a luminance value of 256, giving it a luminance index of 16, found at column 520$q$. In a third cell 550 found at the intersection of row 510$i$ (the current pixel having a luminance index of 8) and column 520$q$ (the immediately prior pixel having a luminance index of 16), a luminance value of 44 is stored. Thus, giving the pixel a luminance value of 44 in the current frame may cause the pixel to be reduced to an actual luminance value of 128 within the span of the current frame.

In other embodiments, the lookup table 418 may instead store offset values corresponding to an amount (e.g., 20%) by which the luminance value of a pixel should be adjusted. In still other embodiments, the lookup table 418 may contain data for modifying current pixel luminance values according to other methods or techniques known in the art.

It will be appreciated that the use of a luminance index value in FIG. 5 is for exemplary purposes only. In some embodiments, no luminance index value is used and a row and column corresponding to each actual pixel value itself (e.g., from 0 to 255) may be used. The lookup table 418 may be of any size suitable for the functions described herein. It will also be appreciated that the use of a luminance index from 0 to 16 is used in FIG. 5 for exemplary purposes only, and that in other embodiments, a different luminance index arrangement may be employed. For example, in some embodiments, the luminance index value may be derived by dividing the actual luminance value by 2, 4, 8, 32, or any other suitable value.

Referring back to FIG. 4, the version of the processed current data frame 422 that has to been modified to achieve the overdrive effect as described above is stored by the overdrive processing unit 460 as overdriven processed current data frame 426. In several embodiments, the overdriven processed current data frame 426 may be provided to the multiplexer 470. The multiplexer 470 may be any multiplexer known in the art for selecting one of several inputs to receive data and pass it out a single output interface. In several embodiments, the multiplexer 470 is communicatively coupled to the blender 450, the overdrive processing unit 460, and the display device (not shown) such that it can receive output data from either the blender 450 or the overdrive processing unit 460 depending on which operation mode the system 400 is in, and pass that output to the display device such as an LCD display. In yet other embodiments, the multiplexer 470 may additionally be coupled to the output of the first video pipeline 430 so that in a third (bypass) mode, the processed current data frame 422 may be passed directly from the first video pipeline 430 to the multiplexer 470 when no blending or overdrive functionality is desired or possible. In still other embodiments, the blender 450 and/or the overdrive processing unit 460 may be configured to pass the processed current data frame 422 to the multiplexer 470 without modification responsive to a selection of a bypass/passive mode by a user or the system 400.

When the system 400 is operating in blending operation mode, the multiplexer 470 is configured to selectively receive the blended data frame 424 from the blender 450 and provide the blended data frame 424 to the display device. When the system 400 is instead operating in overdrive operation mode, the multiplexer 470 is configured to selectively receive the overdriven processed current data frame 426 from the overdrive processing unit 460 and provide the overdriven processed current data frame 426 to the display device.

The components of system 400 may be communicatively coupled through any manner known in the art, and may operate according to any known protocol or standard, including, for example, an AMBA bus. All or some of the components of system 400, including the first frame memory 412, the second frame memory 410, the first video pipeline 430, the second video pipeline 440, the blender 450, the overdrive processing unit 460, the multiplexer 470, and the lookup table 418 may be integrated into a single processor-based circuit on a single microchip 490. This type of integrated configuration is commonly referred to as a "system on a chip." The microchip 490 may comprise a processor such as a programmable general purpose Digital Signal processor (DSP), available from companies such as Analog Devices, to Motorola, or Texas Instruments, or an application specific DSP designed for a particular application and provided by a company such as Zoran Corporation of Sunnyvale, Calif. The microchip 490 may also include other functionality, such as an MPEG-2 decoder, an 8VSB demodulator, and an NTSC video decoder, as in the previously mentioned SupraHD® 780 line of processors. Each of the first video pipeline 430, the second video pipeline 440, the blender 450, the overdrive processing unit 460, and the multiplexer 470 may be implemented as a microcontroller or state machine on the microchip 490. In other embodiments, the first video pipeline 430, the second video pipeline 440, the blender 450, the overdrive processing unit 460, and the multiplexer 470 may be implemented in software or firmware executed on the main processor, or in a combination of hardware, software, and/or firmware.

The microchip 490 may further include one or more timing sources, for example, oscillators or phase-locked loops. The microchip 490 may include one or more interfaces operating according to various industry standards, for example, USB, FireWire, Ethernet, USART, SPI, HDMI, or other interfaces known in the art. The microchip 490 may also include one or more voltage regulators or power management circuits.

It will be appreciated that the components of system 500 are shown as distinct from one another for purposes of example only. For example, the blender 450 and the overdrive processing unit 460 may be different software or firmware components running on a single processor and activated responsive to an operation mode being selected by a user. Some or all of the first frame memory 412, the second frame memory 410, and the lookup table 418 may be separate regions of a single memory component.

Exemplary Methods

Figure 6:
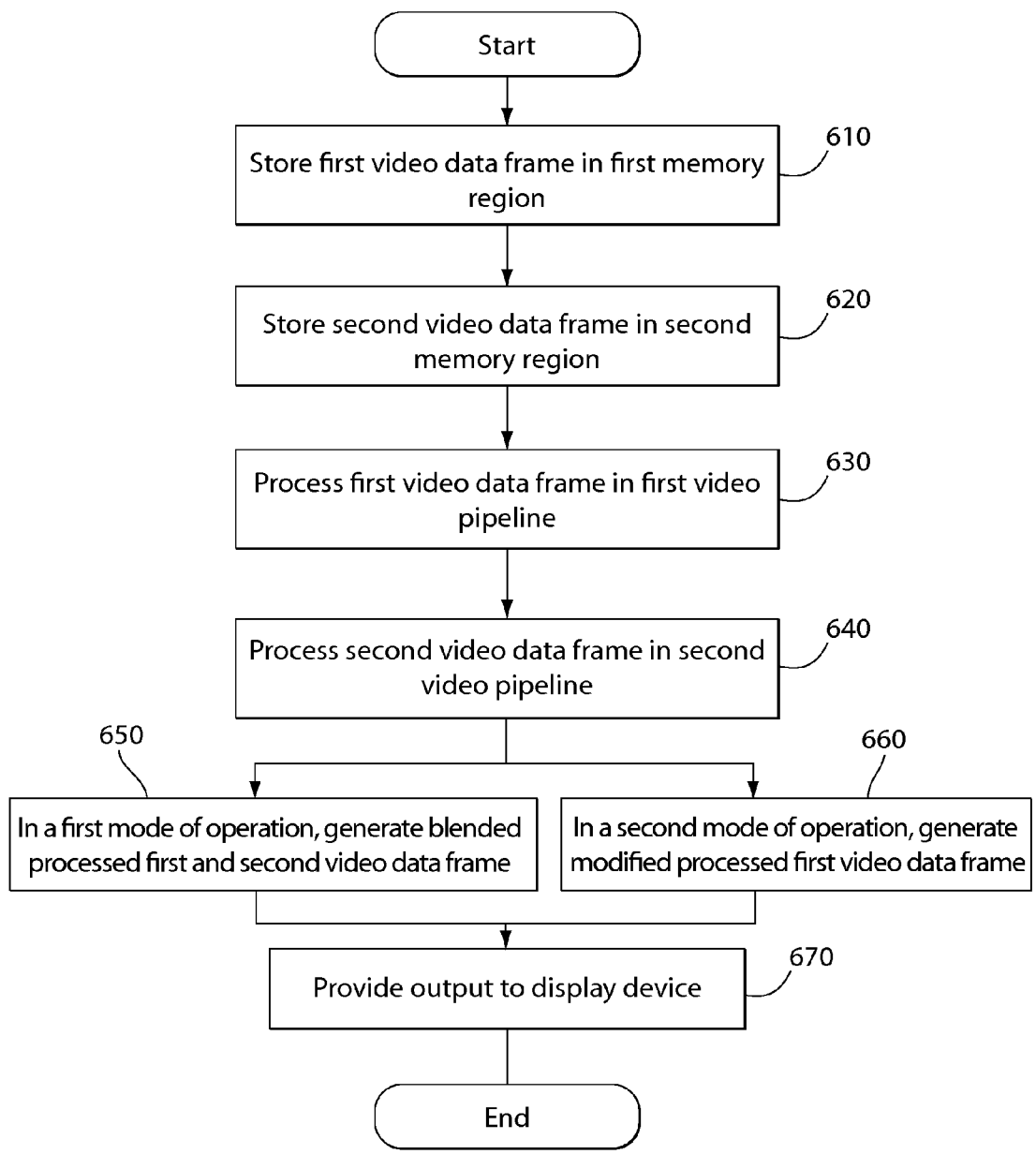
FIG. 6 is a flowchart depicting an exemplary method of operating a versatile display pipeline in accordance with one embodiment of the invention.

Having described various aspects of a system incorporating a versatile display architecture, the operation of such a system according to an exemplary embodiment is now described with reference to FIG. 6.

In act 610, a first video data frame is stored in a first memory region. In several embodiments, the first video data frame is a current frame from a first data source.

In act 620, a second video data frame is stored in a second memory region. For example, the second video data frame may be a current frame from a second data source. Alternately, the second video data frame may be an immediately prior data frame from the first data source.

In act 630, the first video data frame is processed in a first video pipeline to provide a processed first video data frame, and in act 640 the second video data frame is processed in the second video pipeline to provide a processed second video data frame. These acts of processing may include such acts as video decoding, MPEG decoding, deinterlacing, noise reduction, image scaling, gamma correction, image enhancement, colorspace conversion, chroma resampling, frame rate conversion, image compression/video compression, or any other image or video processing functions or methods as are known in the art. It will be appreciated that neither of acts 630 and 640 are a prerequisite to the other, and thus may be performed simultaneously or in any order relative to each other.

In act 650, responsive to selection of a first mode of operation, the processed first video data frame and the processed second video data frame are blended to provide a blended processed first and second video data frame. In some embodiments, the act of blending includes storing the processed first video data frame in a first portion of the blended processed first and second video data frame, and storing the processed second video data frame in a second portion of the blended processed first and second video data frame. This act of blending can be used in some embodiments to generate a "picture in a picture" effect wherein the second portion of the blended processed first and second video data frame is smaller than the first portion. In these embodiments, an area of the first portion may be removed and replaced with the second portion, which in some embodiments may be reduced in size to fit in the area removed from the first portion. In some embodiments, act 650 may further include acts of disabling components that are used responsive to being in a second mode of operation, for example, an overdrive processing unit.

In act 660, responsive to selection of a second mode of operation, the processed first video data frame is modified based upon pixel luminance values of the processed second video data frame to provide a modified processed first video data frame. In some embodiments, the processed first video data frame and the processed second video data frame are from the same video source. In these embodiments, the processed first video data frame may be a current data frame and the processed second video data frame may be an immediately prior data frame from the same data source. In these embodiments, the processed first video data frame may be modified to achieve an overdrive effect as described above. In some embodiments, act 660 may further include acts of referencing a lookup table stored in a memory. In some embodiments, act 660 may further include acts of disabling components that are used responsive to being in the first mode of operation, for example, a blender.

In act 670, either the blended processed first and second video data frame generated in act 650 or the modified processed first video data frame generated in act 660 is provided to a display device. In several embodiments, the blended processed first and second video data frame is provided to the display device responsive to being in the first mode of operation. In several embodiments, the modified processed first video data frame is provided to the display device responsive to being in the second mode of operation.

Having now described some illustrative aspects of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention.

What is claimed is:

1. A video processing system, comprising:
a video frame buffer memory having a first memory region and a second memory region, the first memory region being configured to store a first video data frame and the second memory region being configured to store a second video data frame;
a first video pipeline coupled to the video frame buffer memory and configured to receive and process the first video data frame;
a second video pipeline coupled to the video frame buffer memory and configured to receive and process the second video data frame;
a blender, coupled to the first and second video pipelines, the blender being configured to receive and blend the processed first video data frame and the processed second video data frame in a first mode of operation and to provide the blended processed first and second video data frame to a display; and
an overdrive processing unit, coupled to the first and second video pipelines, the overdrive processing unit being configured to receive the processed first video data frame and the processed second video data frame in a second mode of operation, to modify the processed first video data frame based upon pixel values of the processed second video data frame, and to provide the modified processed first current video data frame to the display.

2. The video processing system of claim 1, wherein in the first mode of operation, the processed first video data frame is displayed in a first portion of the blended processed first and second video data frame and the processed second current video data frame is displayed in a second portion of the blended processed first and second video data frame.

3. The video processing system of claim 2, wherein the display is an LCD television display, and wherein the second portion of the blended processed first and second video data frame is a "picture-in-picture" window within the first portion of the blended processed first and second video date frame.

4. The video processing system of claim 1, wherein in a third mode of operation, the blender is configured to provide the processed first video data frame to the display without any blending.

5. The video processing system of claim 4, further comprising:
a control processor, coupled to the video frame buffer memory, the first and second video pipelines, the blender, and the overdrive processing unit, to configure the video frame buffer memory, the first and second video pipeline, the blender, and the overdrive processing unit according to a selection of one of the first mode of operation, the second mode of operation, and the third mode of operation by a user.

6. The video processing system of claim 1, wherein the video frame buffer memory, the to first and second video pipelines, the blender, and the overdrive processing unit are disposed on a single microchip.

7. The video processing system of claim 1, further comprising:
a multiplexer, having a first input operatively coupled to the blender, a second input operatively coupled the overdrive processing unit, and an output operatively coupled to the display, the multiplexer providing one of the blended processed first and second video data frame and the modified processed first video data frame to the display.

8. The video processing system of claim 1, further comprising at least one lookup table stored in memory that is distinct from the video frame buffer memory, wherein in the second mode of operation the overdrive processing unit is configured to access at least one overdrive pixel value stored in the at least one lookup table and modify a first pixel value of a pixel in the processed first video data frame based upon the at least one overdrive pixel value and a second pixel value of a corresponding pixel in the processed second video data frame.

9. The video processing system of claim 8, wherein the at least one lookup table includes a first lookup table storing at least one overdrive red pixel value, a second lookup table storing at least one stored green pixel value, and a third lookup table storing at least one overdrive blue pixel value;
wherein the pixel and the corresponding pixel conform to an RGB color format; and
wherein in the second mode of operation the overdrive processing unit is configured to replace a red pixel value of the pixel with one of the at least one overdrive red pixel values, to replace a green pixel value of the pixel with one of the at least one overdrive green pixel values, and to replace a blue pixel value of the pixel with one of the at least one overdrive blue pixel values.

10. The video processing system of claim 8, wherein the first pixel value is modified to a greater extent when the first pixel value is greater than the second pixel value than when the first pixel value is less than the second pixel value.

11. The video processing system of claim 1, wherein the video processing system is disposed in a digital LCD television that includes an LCD display.

12. The video processing system of claim 1, wherein the first video data frame is a first current video data frame received from a first data source, wherein in the first mode of operation, the second video data frame is a second current video data frame received from a second data source, and wherein in the second mode of operation, the second video data frame is an immediately prior video data frame relative to the first current video data frame received from the first data source.

13. A method of processing frames of video data, comprising acts of:
storing a first video data frame in a first memory region;
storing a second video data frame in a second memory region;
processing the first video data frame in a first video pipeline to provide a processed first video data frame;
processing the second video data frame in a second video pipeline to provide a processed second current video data frame;
blending, responsive to selection of a first mode of operation, the processed first video data frame and the processed second video data frame to provide a blended processed first and second video data frame;
modifying, responsive to selection of a second mode of operation, the processed first video data frame based upon pixel values of the processed second video data frame to provide a modified processed first video data frame; and
providing one of the blended processed first and second video data frame and the modified processed first video data frame to a display responsive to selection of one of the first mode of operation and the second mode of operation.

14. The method of claim 13, wherein the act of blending includes:
storing the processed first video data frame in a first portion of the blended processed first and second video data frame; and
storing the processed second video data frame in a second portion of the blended processed first and second video data frame.

15. The method of claim 13, wherein the act of modifying the processed first video data frame based upon pixel values of the processed second video data frame includes the acts of:
replacing a red pixel value of at least one pixel of the processed first video data frame with an overdrive red pixel value stored in a first lookup table;
replacing a green pixel value of the at least one pixel with an overdrive green pixel value stored in a second lookup table; and
replacing a blue pixel value of the at least one pixel with an overdrive blue pixel value stored in a third lookup table.

16. The method of claim 13, further comprising acts of:
disabling an overdrive processing unit responsive to selection of a first mode of operation; and
disabling a blender responsive to select of a second mode of operation.

17. The method of claim 13, wherein the first video data frame is a first current video data frame received from a first data source, wherein in the first mode of operation, the second video data frame is a second current video data frame received from a second data source, and wherein in the second mode of operation, the second video data frame is an immediately prior video data frame relative to the first current video data frame received from the first data source.

* * * * *

UNITED STATES PATENT AND TRADEMARK OFFICE
CERTIFICATE OF CORRECTION

| | | |
|---|---|---|
| PATENT NO. | : 8,248,535 B2 | Page 1 of 1 |
| APPLICATION NO. | : 12/643341 | |
| DATED | : August 21, 2012 | |
| INVENTOR(S) | : Lei He | |

It is certified that error appears in the above-identified patent and that said Letters Patent is hereby corrected as shown below:

Col. 15, In Claim 6, line 6, immediately after "memory," please delete the word "to".

Signed and Sealed this
Eighteenth Day of December, 2012

David J. Kappos
*Director of the United States Patent and Trademark Office*